(12) United States Patent
Tonani et al.

(10) Patent No.: US 9,790,639 B2
(45) Date of Patent: Oct. 17, 2017

(54) CELLULOSE SUBSTRATE WITH ANTI-FLAME PROPERTIES AND RELATIVE PRODUCTION METHOD

(71) Applicants: TORCITURA PADANA S.p.A., Pieve Porto Morone (PV) (IT); ZANOLO S.p.A., Arborio (VC) (IT)

(72) Inventors: Alberto Tonani, Casanova Elvo (IT); Andrea Novello, Cossato (IT); Calogero Sirna, Ziano Piacentino (IT); Simone Giannatempo, Pieve Porto Morone (IT)

(73) Assignees: Torcitura Padana S.p.A., Pieve Porto Morone (PV) (IT); Zanolo S.p.A., Arborio (VC) (IT)

( * ) Notice: Subject to any disclaimer, the term of this patent is extended or adjusted under 35 U.S.C. 154(b) by 0 days.

(21) Appl. No.: 14/910,244

(22) PCT Filed: Aug. 4, 2014

(86) PCT No.: PCT/IB2014/063678
§ 371 (c)(1),
(2) Date: Feb. 4, 2016

(87) PCT Pub. No.: WO2015/019272
PCT Pub. Date: Feb. 12, 2015

(65) Prior Publication Data
US 2016/0201257 A1    Jul. 14, 2016

(30) Foreign Application Priority Data
Aug. 5, 2013   (IT) .............................. TO2013A0670

(51) Int. Cl.
*D06M 13/244*  (2006.01)
*D06M 13/44*   (2006.01)
*C08B 5/00*    (2006.01)
*C08B 5/14*    (2006.01)
*C08B 15/00*   (2006.01)
(Continued)

(52) U.S. Cl.
CPC ............... *D06M 13/44* (2013.01); *C08B 5/00* (2013.01); *C08B 5/14* (2013.01); *C08B 15/005* (2013.01); *C08L 1/16* (2013.01); *D06M 11/66* (2013.01); *D06M 13/288* (2013.01);
(Continued)

(58) Field of Classification Search
CPC .......... C08B 5/00; C08B 5/14; C08B 15/005; C08L 1/16; C08L 2201/02; D06M 11/66; D06M 13/288; D06M 13/432; D06M 13/44; D06M 2200/30; D06M 2101/06
See application file for complete search history.

(56) References Cited

U.S. PATENT DOCUMENTS 5,788,915 A     8/1998  Blount
2007/0082139 A1* 4/2007 Dermeik ............. D06M 13/282
                                               427/393.3

OTHER PUBLICATIONS

STIC Search Report dated Mar. 27, 2017.*
(Continued)

*Primary Examiner* — Eisa Elhilo
(74) *Attorney, Agent, or Firm* — Nixon & Vanderhye P.C.

(57) ABSTRACT

Method for sulphation and phosphorylation of a cellulose substrate for imparting anti-flame properties to the substrate in which at least one phosphonic acid of formula (I):

$$PO(OH)_2-R-PO(OH)_2, \qquad (I)$$

is used as a catalyst of sulphation and a phosphorylating agent and relative substrate.

22 Claims, 3 Drawing Sheets

(51) Int. Cl.
*C08L 1/16* (2006.01)
*D06M 11/66* (2006.01)
*D06M 13/288* (2006.01)
*D06M 13/432* (2006.01)
*D06M 101/06* (2006.01)

(52) U.S. Cl.
CPC ....... *D06M 13/432* (2013.01); *C08L 2201/02* (2013.01); *D06M 2101/06* (2013.01); *D06M 2200/30* (2013.01)

(56) References Cited

OTHER PUBLICATIONS

International Search Report for PCT/IB2014/063678 dated Jan. 5, 2015, four (4) pages.
Written Opinion of the ISA for PCT/IB2014/063678 dated Jan. 5, 2015, four (4) pages.
Database Compendex [Online], Lewin Menachem: Flame retarding of polymers with sulfamates. I. Sulfation of cotton and wool, *Journal of Fire Sciences 1997*, vol. 15, No. 4, Jul. 1997 (pp. 263-276), one (1) page.
Database Compendex [Online], Issacs P. et al., "Flame-resistant Cellulose Esters", XP002716565, Sep. 1974, one (1) page.
Dan Aoki et al., "Phosphorylated cellulose propionate derivatives as thermoplastic flame resistant/retardant materials: influence of regioselective phosphorylation on their thermal degradation behaviour", *Cellulose*, vol. 17, No. 5, Aug. 3, 2010, pp. 963-976.

\* cited by examiner

CELLULOSE SUBSTRATE WITH
ANTI-FLAME PROPERTIES AND RELATIVE
PRODUCTION METHOD

This application is the U.S. national phase of International Application No. PCT/IB2014/063678 filed 4 Aug. 2014 which designated the U.S. and claims priority to IT Patent Application No. TO2013A000670 filed 5 Aug. 2013, the entire contents of each of which are hereby incorporated by reference.

FIELD OF THE INVENTION

The present description concerns a method for imparting anti-flame properties to a cellulose substrate and the relative substrate.

TECHNOLOGICAL BACKGROUND

Figure 1:
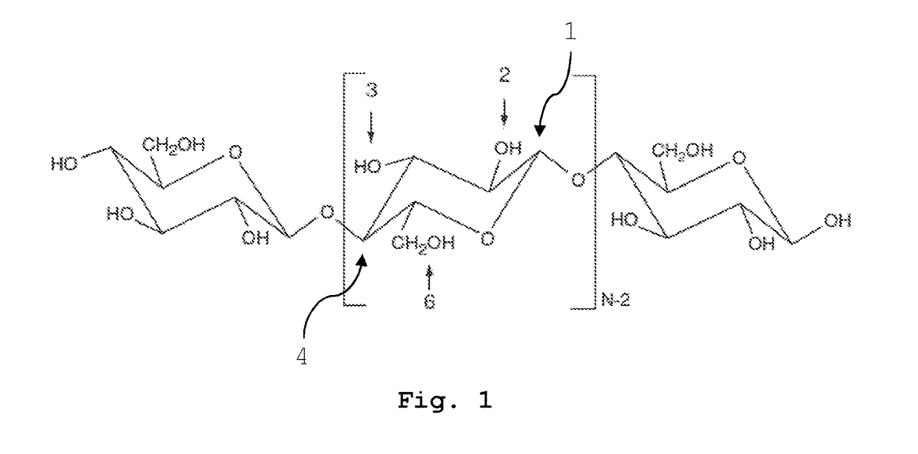
FIG. 1: shows the chemical structure of cellulose substrates.

Cellulose fibres are mainly formed from cellulose, and their chemical reactivity is determined by the presence of numerous glucan units linked together in 1,4 position as shown in FIG. 1[2,6].

The chemical structure of cellulose fibres shown schematically in FIG. 1 shows that the hydroxyl groups 2-OH, 3-OH and 6-OH present on each glucan unit are available for chemical reactions similar to the reactions in which primary, secondary and tertiary alcohols can participate[2,6].

Figure 2:
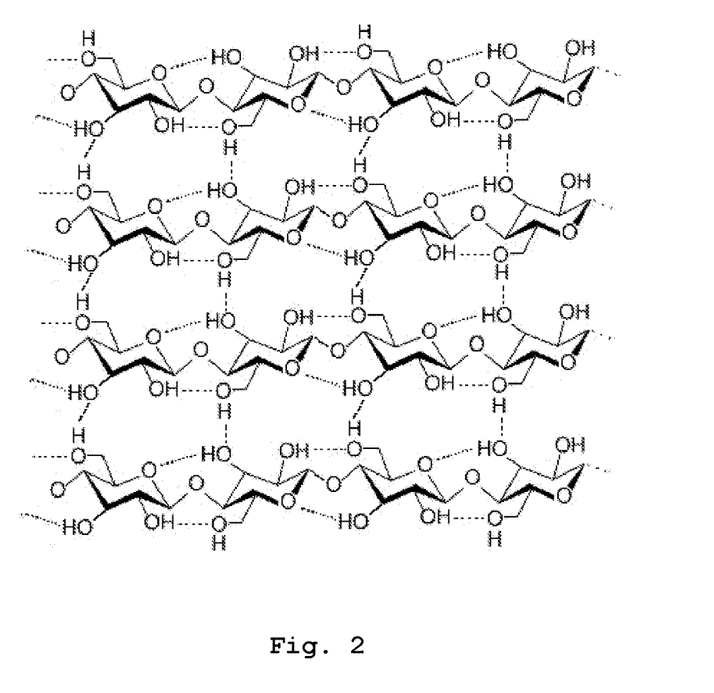
FIG. 2: shows the chemical structure of cellulose microfibrils.

Cellulose fibres are associated with each other through the formation of intermolecular hydrogen bonds (shown schematically in FIG. 2); such links give rise to structures known as microfibrils that are organized into macrofibrils, which in turn are organized into fibres.

Chemicals with access to the internal pores of the fibre will find that many potentially reactive sites are not available due to their involvement in the aforementioned hydrogen bridges.

The reactivity of the hydroxyl groups of the cellulose fibres, as determined by chemical kinetics measurement, is in the order 2-OH>3-6-OH>>OH[2,6].

Because cellulose fibres are widely used in the production of soft furnishings for both private and public spaces (such as theatres, cinemas, conference rooms, etc.), research has focused on improving the anti-flame properties of cellulose fibres.

Combustion takes place when there is:
a fuel;
an comburent, commonly oxygen in the air; and
a heat source capable of promoting physical and chemical changes on the comburent such as to initiate the combustion of the fuel.

From this moment, the phenomenon of combustion is self-powered by the heat produced.

Figure 3:
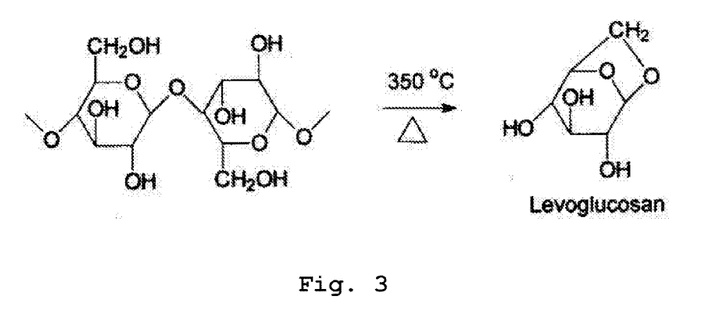
FIG. 3: shows the reaction of thermal decomposition of cellulose.

An important step in the combustion of cellulose fibres is the initial formation of the depolymerisation product levoglucosan, as illustrated in FIG. 3.

Levoglucosan is the precursor of volatile inflammables, which are the main contributors to the speed of propagation of cellulose combustion.

Reducing the formation of levoglucosan reduces the amount of volatile combustibles and therefore the flammability of the cellulose fibres.

Fibrous materials can be inorganic, thus incombustible (asbestos, glass, ceramics), or organic (cellulose, wool, artificial or synthetic fibres).

The combustibility of fibrous materials of organic origin is measured, for example, in terms of the minimum quantity of oxygen required to burn a fibre. In this sense, the Oxygen Index (OI) or Limiting Oxygen Index (L.O.I.) is the minimum percent concentration of oxygen (vol) at which combustion continues for 3 minutes after ignition of the tip of the specimen with a free flame which is then removed.

A material with an OI>21, corresponding to the oxygen content of air should not give self-sustaining combustion, even if triggered. However, for prudence dictated by differences between the test conditions and those of a fire, materials are indicatively considered to be flame retardant materials when O.I. is >25. Table 1 lists the reaction to fire and values of O.I. for the main polymers used in textiles.

TABLE 1

| Reaction to fire | Material | L.O.I. (%) |
| --- | --- | --- |
| Fibres that ignite easily | Polypropylene | 18 |
| | Acrylic | 19 |
| | Cotton | 20 |
| | Polyamide | 22 |
| | Polyester | 22 |
| Fibres with flame retardant characteristics | Wool | 25 |
| | Polypropylene FR | 27 |
| | | 29 |
| | | 31 |
| | | 31-34 |
| Heat resistant fibres | Aramid | 29-34 |
| | Polyamide-imide | 30-32 |
| | Cross-linked polyacrylate | 45 |
| | Polybenzene-imidazole | 48 |
| | Preoxidised Acrylics | 50 |

The first group includes both natural and artificial fibres that are easily inflammable, characterized by an L.O.I. around 18 (cotton, acrylic, polypropylene, cellulose fibres). Other synthetic fibres have a L.O.I. around 22 (polyamide, polyester), and provide behaviour acceptable only in less critical applications (flooring, wall coverings, etc.). In this group, wool with a value of around 25 is the only fibre that can almost be defined as a natural flame retardant.

The second group includes fibres treated to impart anti-flame properties, characterized by L.O.I. values comprised between 28 and 31. These are the fibres most used for the production of textiles, intended for use in all areas at risk of fire.

To reduce the combustion capability of cellulose fibres, recourse has been taken to various procedures that chemically modify the fibres themselves.

Procedures currently known to reduce the combustibility of cellulose fibres are divided into two categories:
application—by physical processes—on the fibrous material of intumescents and barriers that reduce the contact with the comburent, and/or
application—through chemical processes—on the fibrous material of inhibitors that interfere with the combination of volatile fuels (levoglucosan) with the comburent.

In the following, the term "physical treatment" of a cellulose substrate means a process that does not involve a chemical modification of the cellulose fibres, but rather a simple application on the surface of the cellulose substrate of substances capable of imparting anti-flame properties.

The term "chemical treatment" means a process that involves a modification of the chemical structure of cellulose fibres to impart anti-flame properties to the cellulose substrate treated.

In the following, further details will be provided concerning the various procedures known in the art for protecting cellulose fibres from fire.

A method for protecting cellulose fibres from fire provides for the application by means of coating on the surface of the textile material itself of "ceramic materials" that—by delaying the transmission of heat to the fibrous polymer—decrease and control pyrolysis and ignition.

A different method for imparting anti-flame properties to cellulose fibres envisions application to the fibres by means of coating of aluminium hydroxide and magnesium that—by absorbing heat and decomposing via strongly endothermic reactions—prevent attainment of the ignition temperature of the fibre, thus avoiding combustion or making it more controllable.

Until now, the use of boron salts is known; applied by coating on and/or impregnation of the cellulose fibres, in the presence of heat (such as that generated by a heat source) these emit water vapour and produce a vitreous "foam" with scarce heat conduction capacity around the fibre.

The application of halogen-containing compounds and/or antimony-based compound by means of coating is also known.

In the following, information will be provided about methods for the chemical treatment of a cellulose substrate that involve modification of the chemical structure of the cellulose constituting the cellulose fibres of the substrate to impart anti-flame properties to the substrate.

A method for imparting anti-flame properties to cellulose fibres involves applying to the fibres, by means of a chemical treatment, compounds that reduce the formation of volatile flammable compounds favouring the formation of a carbonaceous residue. Carbon residue is much less flammable than volatile organics, and its oxidation (combustion) is slower and in always localized, thus making the propagation of the combustion controllable.

This effect can be obtained, for example, promoting the dehydration of the cellulose to carbon at a temperature lower than that of the usual pyrolysis of the fibre.

The thermal dehydration of cellulose with the formation of carbonaceous residue is mainly promoted by acids. Chemicals that can provide acid in the first stage of pyrolysis constitute major fireproofing products for cellulose fibres. The presence of nitrogen also makes an important contribution to the mechanism of fireproofing. A significant reduction of the formation of levoglucosan is obtained by means of esterification of the primary hydroxyl in position C6 of the cellulose by phosphoric acid derivatives.

It is also possible to interfere with the combustion of the cellulose fibres by promoting the formation of incombustible gas, which is mainly realized by application to the fibre (through a chemical reaction) of nitrogen compounds or ammonium base or of compounds containing halogens. At the pyrolysis temperature, these produce non-combustible gases such as ammonia, water, $CO_2$, halo acids, etc. that simultaneously dilute the concentrations of the oxidiser (oxygen in the air) and the flammable gases from the pyrolysis of cellulose fibre.

There are also other methods to improve the flame resistance of cellulose fibres.

Methods are known that provide treatments of the cellulose fibres employing salts or partially salified acids of phosphorus, derivatives based on N-methylamides of phosphines and phosphine oxides, vinyl phosphonates. However, these methods are not satisfactory because they create chemically modified cellulose fibres with a low flame resistance.

Other phosphorus-based compounds have been identified, such as diethyl {3-[(hydroxymethyl)amino]-3-oxypropyl}phosphonate, to improve the flame resistance of cellulose. The application of these compounds provides cellulose substrates that can pass the vertical flame test, but unfortunately makes the hand of the finished products very hard and rough, not to mention the production of formaldehyde during the process that affects worker safety in the workplace.

A different procedure for imparting anti-flame properties to cellulose fibres, and currently the most used, involves the polymerization of the monomer tetrakis(hydroxymethyl) phosphonium chloride with ammonia in anhydrous phase directly on the cellulose substrate. Apart from the hazard of the reaction, the formation of such polymers involves a drastic change of the appearance of the finished textile substrate, in particular making the hand of the fabric stiff and rough.

In view of the insufficient anti-flame properties of cellulose fibres obtainable with the previously described procedures, methods for sulphation and phosphorylation of fibres had already been developed in the 50s.

The known reactions that take place in the process of sulphation of cellulose are the following[4,5,7]:

$$Cell\text{-}OH + NH_2SO_2ONH_4 \rightarrow Cell\text{-}OSO_2NH_2 + NH_3 + H_2O$$

$$2\,Cell\text{-}OH + NH_2SO_2ONH_4 \rightarrow Cell\text{-}OSO_2O\text{-}Cell + 2\,NH_3 + H_2O$$

$$Cell\text{-}OH + NH_2SO_2ONH_4 \rightarrow Cell\text{-}OSO_2ONH_4 + NH_3$$

The known reaction that takes place during the process of phosphorylation of cellulose is[9]:

$$Cell\text{-}OH + H_3PO_4 \rightarrow Cell\text{-}OPO_3H_2 + H_2O$$

Typical formulations for conducting the cellulose sulphation reaction consist of solutions based on aqueous ammonium sulphamate and urea or its derivatives.

Typical formulations for conducting the cellulose phosphorylation reaction consist essentially of aqueous solutions based on phosphoric acid and/or its mono and dibasic salts and/or phosphoramide and its derivatives.

The method of sulphation and phosphorylation of a cellulose substrate is achieved by immersion through pressing of the substrate in a solution containing the sulphation compounds and subsequently in a solution containing the phosphorylation compounds, drying the substrate, allowing the sulphation and phosphorylation reactions to go to completion at temperatures above 180° C.[4,5,7] for a several minutes; reaction by-products are removed by washing the treated substrate.

However, such procedure has numerous disadvantages.

The first and main disadvantage is the loss of resistance of the treated substrate.

From a chemical point of view the strong acidity developed in the reaction phase by phosphoric acids and by ammonium sulphamate and the high temperatures needed for completion of the reactions cause degradation of the 1,4 glucosidic bonds of cellulose, with a substantial drop in the molecular weight of the cellulose polymer and subsequent loss of up to 70% of the tensile strength of the substrate[4,5,7].

The second disadvantage of the sulphation and phosphorylation method is determined by the different kinetics of the two reactions.

The sulphation reaction is very slow when applied to solid substrates such as cellulose, while phosphorylation on the contrary is very fast; it follows that the when sufficient sulphation of the substrate has been obtained, the excessive phosphorylation damages it irreparably. Also, it is important to note that the excessive presence of phosphorus does not improve the anti-flame properties of the substrate.

Therefore, it is essential to proceed in two distinct reaction steps with a very significant increase in the production costs.

A separate disadvantage is related to the lack of efficacy of the procedure in conferring anti-flame properties to the cellulose substrate: the mechanism of phosphorylation preferably employs phosphoryl acids or their salts.

Figure 4:
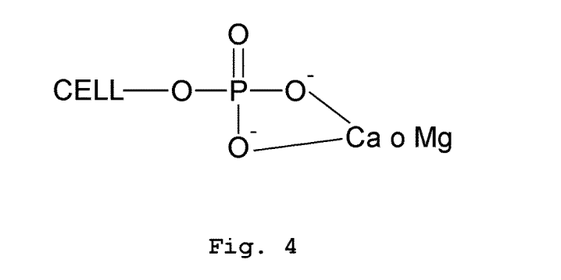
FIG. 4: shows the chemical structure of cellulose phosphorylated according to the known technique.

The yield of this reaction is very high, but when the substrate is subjected to washing in water, calcium and magnesium ions present in the water bind to the unreacted hydroxyl groups of phosphoryl groups linked to the cellulose substrate to form insoluble salts that inhibit the anti-flame power of the substrate, as illustrated in FIG. 4.

To eliminate the disadvantages associated with phosphorylation reactions using phosphoric acid, the use of nitrogen-containing resins such as derivatives of dimethylolethylene-urea or dimethylol dihydroxyethylene-urea during the phosphorylation and/or sulphation reactions has been proposed.

However, such alternative has problems both in the processing phase and with the finished product: the release of free formaldehyde during the reaction causes safety problems for the operators, also formaldehyde binds to the cellulose substrate by covalent bonds determining problems with toxicity and carcinogenicity of the substrate itself.

In addition, an environmental problem is associated with the sulphation and phosphorylation method. The sulphation reaction requires urea (or its derivatives), which—at the moment when it reaches its melting point around 130-135° C.—creates a dense, white mist[4,5,7] inside the reactor (oven) and its sublimation gives rise to accumulations on the reactor walls.

The sulphation reaction releases also ammonia gas as a by-product with the need to neutralize the fumes resulting in a significant economic impact on the industrial process.

The method of sulphation and phosphorylation implemented using phosphoric acid was commercially abandoned in the 70s in view of the numerous disadvantages discussed above.

SUMMARY OF THE INVENTION

The object of the present description is the development of a new method for the treatment of a cellulose substrate capable of imparting improved anti-flame properties to the substrate and simultaneously not degrading the substrate itself, while avoiding workplace safety problems for the operators.

In accordance with the present invention, the above object is achieved by means of the solution recalled specifically in the attached claims, which constitute an integral part of the present description.

The solution provided in the present description to the problems set out above is the use of phosphonic acids as sulphation catalysts and phosphorylating agents capable of reacting with a cellulose substrate having reactive hydroxyl groups.

An embodiment of the present description relates to a cellulose substrate subjected to chemical treatment to impart anti-flame properties to the substrate, in which the treated substrate has a L.O.I. comprised between 25 and 35, more preferably between 28 and 32, and has tensile strength, abrasion resistance and hand that are substantially equal to those of an untreated cellulose substrate.

A different embodiment of the present description relates to a method for providing a cellulose substrate with anti-flame properties that envisions the following operations:
i) provide a cellulose substrate;
ii) prepare a sulphation and phosphorylation solution, preferably under heated condition, the sulphation and phosphorylation solution comprising water, ammonium sulphamate, urea and at least one compound of formula (I):

PO(OH)$_2$—R—PO(OH)$_2$         (I)

wherein

R represents a linear or branched, substituted or unsubstituted $C_{1-10}$, preferably $C_{1-5}$, alkyl group; a N($R_1$) group; a $R_2$N($R_3$)$R_4$ group;

$R_1$ represents H, a linear or branched, substituted or unsubstituted $C_{1-5}$, preferably $C_{1-3}$, alkyl group;

$R_2$ and $R_4$ represent independently a linear or branched, substituted or unsubstituted $C_{1-5}$, preferably $C_{1-3}$, alkyl group;

$R_3$ represents a linear or branched, substituted or unsubstituted $C_{1-5}$, preferably $C_{1-3}$, alkyl group; a $R_5$N($R_6$)$R_7$ group;

$R_5$ and $R_7$ represent independently a linear or branched, substituted or unsubstituted $C_{1-5}$, preferably $C_{1-3}$, alkyl group;

$R_6$ represents a linear or branched, substituted or unsubstituted $C_{1-5}$, preferably $C_{1-3}$, alkyl group; a $R_8$N($R_9$)$R_{10}$ group;

$R_8$, $R_9$ and $R_{10}$ represent independently a linear or branched, substituted or unsubstituted $C_{1-5}$, preferably $C_{1-3}$, alkyl group;

with the proviso that the number of —PO(OH)$_2$ groups in the general formula (I) is not greater than 5;

iii) immerse the cellulose substrate in the sulphation and phosphorylation solution;
iv) extract the cellulose substrate from the sulphation and phosphorylation solution;
v) maintain the cellulose substrate at a temperature comprised between 110° and 175° C. for a period of time comprised between 1 minute and 3 hours, obtaining at the end a sulphated and phosphorylated cellulose substrate with anti-flame properties.

The method of the present description provides a cellulose substrate with anti-flame properties having tensile strength, abrasion resistance and a hand substantially equal to those of an untreated cellulose substrate.

BRIEF DESCRIPTION OF THE FIGURES

The invention will now be described in detail, by way of non-limiting example, with reference to the attached figures, in which.

DESCRIPTION OF THE PREFERRED EMBODIMENTS

The invention will now be described in detail, by way of non-limiting example, with reference to a cellulose substrate with improved anti-flame properties essentially consisting of cotton.

It is clear that the scope of this description is in no way limited to a cotton substrate; the procedure described herein is applicable to cellulose substrates of natural or artificial origin, such as flax, jute, hemp, coconut, ramie, bamboo, raffia, esparto, manila, sisal, nettle, kapok, cellulose, preferably pure cellulose, cellulose acetate, cellulose triacetate, viscose, modal, lyocell, cupra rayon, rubber (natural rubber) and alginate or mixtures thereof.

Furthermore, while the experimental data provided below refer to a cellulose substrate essentially consisting of cotton in the form of yarn, the method of the present description is applicable to cellulose substrates in the form of fibres, ribbons, cords, threads, fabrics and non-woven fabrics.

In the following description, numerous specific details are presented to provide a complete understanding of the embodiments. The embodiments may be practiced without one or more of the specific details, or with other processes, components, materials, etc. In other cases, well-known structures, materials, or operations are not shown or described in detail to avoid obscuring certain aspects of the embodiments.

Throughout the present specification, reference to "one embodiment" or "an embodiment" means that a particular configuration, structure, or feature described in connection with the embodiment is included in at least one embodiment. So, the appearance of the phrases "in one embodiment" or "in a certain embodiment" in various places throughout the present specification does not necessarily refer to the same embodiment. Furthermore, particular configurations, structures, or characteristics may be combined in any suitable manner in one or more embodiments.

The headings presented herein are merely for convenience and do not interpret the scope or meaning of the embodiments.

An embodiment of the present description relates to a cellulose substrate subjected to chemical treatment to impart anti-flame properties to the substrate, in which the treated substrate has a L.O.I. comprised between 25 and 35, more preferably between 28 and 32, and has tensile strength, abrasion resistance and hand that are substantially equal to those of an untreated cellulose substrate.

An embodiment of the present description relates to a method of sulphation and phosphorylation of a cellulose substrate for imparting anti-flame properties to the substrate characterized by the use of at least one phosphonic acid that functions as a sulphation catalyst and a phosphorylating agent capable of reacting with any cellulose substrate having reactive hydroxyl groups.

The phosphonic acids used in the procedure described herein are organic compounds that contain 2 to 5 phosphonic groups.

In one embodiment, the phosphonic acids used in the procedure described herein are represented by the general formula (I):

$$PO(OH)_2\text{—}R\text{—}PO(OH)_2 \qquad (I)$$

wherein

R represents a linear or branched, substituted or unsubstituted $C_{1-10}$, preferably $C_{1-5}$, alkyl group; a $N(R_1)$ group; a $R_2N(R_3)R_4$ group;

$R_1$ represents H, a linear or branched, substituted or unsubstituted $C_{1-5}$, preferably $C_{1-3}$, alkyl group;

$R_2$ and $R_4$ represent independently a linear or branched, substituted or unsubstituted $C_{1-5}$, preferably $C_{1-3}$, alkyl group;

$R_3$ represents a linear or branched, substituted or unsubstituted $C_{1-5}$, preferably $C_{1-3}$, alkyl group; a $R_5N(R_6)R_7$ group;

$R_5$ and $R_7$ represent independently a linear or branched, substituted or unsubstituted $C_{1-5}$, preferably $C_{1-3}$, alkyl group;

$R_6$ represents a linear or branched, substituted or unsubstituted $C_{1-5}$, preferably $C_{1-3}$, alkyl group; a $R_8N(R_9)R_{10}$ group;

$R_8$, $R_9$ and $R_{10}$ represent independently a linear or branched, substituted or unsubstituted $C_{1-5}$, preferably $C_{1-3}$, alkyl group;

with the proviso that the number of —$PO(OH)_2$ groups in the general formula (I) is not greater than 5.

In one embodiment, when any one of the groups R, $R_1$, $R_2$, $R_3$, $R_4$, $R_5$, $R_6$, $R_7$, $R_8$, $R_9$, $R_{10}$, if present, is a substituted alkyl group, the one or more substituents are selected independently from —OH, —COOH, —$PO(OH)_2$, $NH_2$, —$NHR_{11}$, —$NR_{12}R_{13}$, —Cl, —Br, —F, wherein $R_{11}$, $R_{12}$ and $R_{13}$ represent independently a linear or branched, substituted or unsubstituted $C_{1-5}$, preferably $C_{1-3}$, alkyl group;

with the proviso that the number of —$PO(OH)_2$ groups in the general formula (I) is not greater than 5.

In one embodiment, when any of the groups $R_{11}$, $R_{12}$ and $R_{13}$, if present, represent a substituted alkyl group, the one or more substituents are represented by the —$PO(OH)_2$ group with the proviso that the number of —$PO(OH)_2$ groups in the general formula (I) is not more than 5.

In one embodiment, the groups $R_2$, $R_4$, $R_5$ and $R_8$, if present, represent independently an unsubstituted alkyl group.

In one embodiment, when the groups $R_3$, $R_6$, $R_7$, $R_9$ and $R_{10}$, if present, represent independently a substituted alkyl group, the one or more substituents are represented by —$PO(OH)_2$ group, provided that the number of $PO(OH)_2$ groups in the general formula (I) is not more than 5.

In one embodiment, the phosphonic compounds of formula (I) used in the method described herein are: 1-hydroxyethan-1,1-diphosphonic acid, hydroxyethyl-imino-bis-(methylene-phosphonic) acid, amino-tris-(methylene phosphonic) acid, ethylenediamine tetra-(methylene phosphonic) acid, diethylentriamine-penta-(methylene phosphonic) acid, (1-aminoethylidene) bisphosphonic acid, oxidronic acid, pamidronic acid, alendronic acid, (1-hydroxy-2-methyl-1-phosphonopropyl) phosphonic acid, (aminomethylene) bisphosphonic acid, 1-hydroxypentane-1,1-bisphosphonic acid, [(2-hydroxypropan-1,3-diyl) bis(nitrilodimethane-diyl)] tetrakis-phosphonic acid, clodronic acid, (difluoromethylene) bisphosphonic acid, (dibromomethylene) bisphosphonic acid, (hydroxymethan) bisphosphonic acid.

In one embodiment, the method of sulphation and phosphorylation of a cellulosic substrate provides the following steps:

i) provide a cellulose substrate;
ii) prepare a sulphation and phosphorylation solution, preferably under heated condition, the sulphation and phosphorylation solution comprising water, ammonium sulphamate, urea and at least one compound of formula (I) as described above;

iii) immerse the cellulose substrate in the sulphation and phosphorylation solution;

iv) extract the cellulose substrate from the sulphation and phosphorylation solution;

v) maintain the cellulose substrate at a temperature comprised between 110° and 175° C. for a period of time comprised between 1 minute and 3 hours, obtaining at the end a sulphated and phosphorylated cellulose substrate with anti-flame properties.

In one embodiment, before operation v) the substrate extracted from the sulphation and phosphorylation solution is subjected to a centrifugation and heat drying operation, preferably at a temperature between 70 and 90° C.

In one embodiment, at the end of the operation v) the substrate is subjected to a washing operation, preferably under heated condition, and heat drying, preferably at a temperature between 70 and 90° C.

In one embodiment, the sulphation and phosphorylation solution is prepared by mixing in the following order water, urea, at least one phosphonic acid of formula (I) and ammonium sulphamate.

In one embodiment, the sulphation and phosphorylation solution contains:
water in a quantity comprised between 80 and 25% w/w, preferably 50 and 60% w/w,
urea in an amount comprised between 10 and 30% w/w, preferably 10 and 20% w/w,
at least one phosphonic acid of formula (I) in an amount comprised between 5 and 30% w/w, preferably 10 and 20% w/w, and
ammonium sulphamate in an amount comprised between 5 and 30% w/w, preferably 8 and 15% w/w.

Without wishing to be bound to any one theory in that regard, the inventors have reason to believe that the reactions of sulphation and phosphorylation of a cellulose substrate according to the present description can be illustrated as shown in diagram I.

Diagram I

In one embodiment, when the compound of formula (I) contains an alkyl group substituted with a primary hydroxyl, the inventors have reason to believe that this hydroxyl group is able to react with the ammonium sulphamate compound.

By way of example, when the R group represents an alkyl group substituted with a primary hydroxyl group, the inventors have reason to believe that the sulphation and phosphorylation reactions of a cellulose substrate according to the present description can be illustrated as shown in diagram II.

Diagram II

The method of the present description overcomes the disadvantages of the traditional method of sulphation and phosphorylation of a cellulose substrate.

First the procedure described herein does not determine a loss of resistance of the cellulose substrate, as it does not cause degradation of the 1,4 glucosidic bonds of the cellulose.

The phosphonic acids of formula (I) as catalysts in the sulphation reaction and as phosphorylating agents produce a weakly acidic reaction unable to break the 1,4 glucosidic bonds of the cellulose.

Moreover, the phosphonic acids of formula (I) contain from 2 to 5 free phosphonic groups capable of reacting with all or part of the free hydroxyl groups of cellulose, which results in a high capacity of these compounds to bind to cellulose.

The anti-flame properties of the substrate subjected to the method of sulphation and phosphorylation according to the present description are improved compared to what is obtainable with known methods, in that it produces a massive synergistic accumulation of sulphur, nitrogen and phosphorus bound to the cellulose substrate, without weakening it.

In an unexpected way, the use of phosphonic acids of formula (I) allows the sulphation and phosphorylation reactions to be carried out simultaneously. The reaction kinetics are relatively fast.

An excellent degree of sulphation, nearly double that of the classical method, is achieved already in the first minutes of reaction and starting at a temperature of 110° C.

Without wishing to be bound to any one theory in this regard, the inventors have reason to believe that the aqueous solution based on phosphonic acids, urea and ammonium sulphamate with heating determines, in addition to partial evaporation of the water, the formation of an oily liquid mass with a pH approximately equal to 2 that, by penetrating inside of the cellulose fibrils, creates ideal acidic conditions for the solid-liquid sulphation and phosphorylation reactions of the cellulose at temperatures in the order of 100-110° C.

In particular, the inventors have reason to believe that urea is able to create complexes with phosphonic acids, wherein such complexes are more soluble in an aqueous environment than the phosphonic acids alone, thus allowing a nearly quantitative reaction of these compounds with the cellulose itself.

The sulphation and phosphorylation method according to the known technique, namely by employing phosphoric acid in quantities less than 1% (as a larger quantity would lead to the dissolution of the cellulose substrate itself), involves recrystallisation of the reagents on the fibre at temperatures below 140-150° C.; only at temperatures above 140-150° C. is urea able to act as a reaction solvent to facilitate the sulphation and phosphorylation reactions.

It is important to note that in the absence of at least one phosphonic acid of formula (I) a method of sulphation and phosphorylation shows no sign of cellulose sulphation at temperatures from 110° C. to 140° C.

Figure 5:
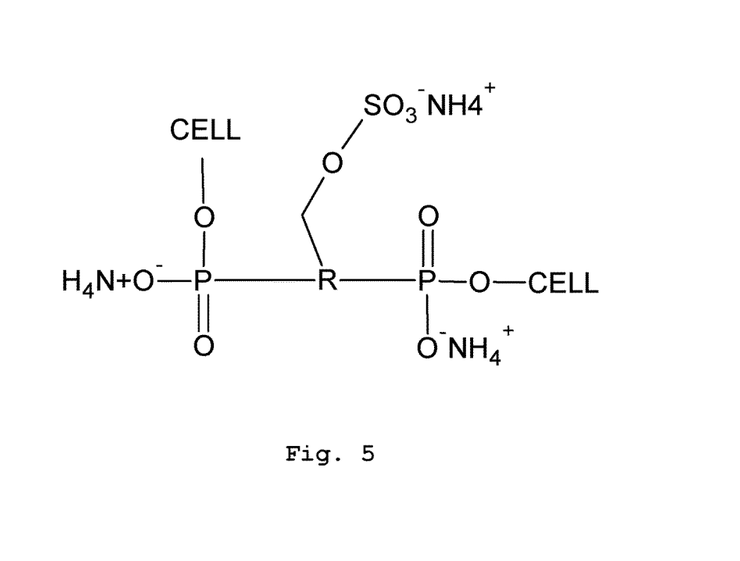
FIG. 5: shows the chemical structure of a phosphorylating agent according to the present description containing at least one primary hydroxyl free to react with ammonium sulphamate.

Without wishing to be bound to any one theory in that regard, the inventors have reason to believe that sulphation starts first on the phosphorylating agent, if it contains a reactive primary alcohol[1,3,8] (obtaining a compound as shown in FIG. 5) and only successively on the solid cellulose substrate, which usually reacts at minimal temperatures from 150° C. to 200° C.

Figure 6:
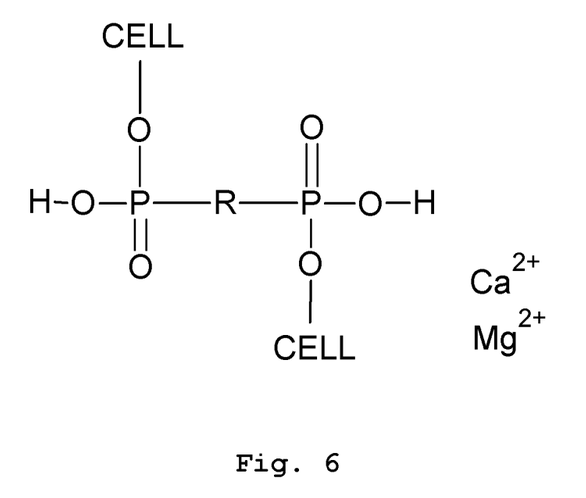
FIG. 6: shows the chemical structure of cellulose subjected to a sulphation and phosphorylation method according to the present description.

The phosphorylation reaction conducted with at least one compound of general formula (I) is also almost quantitative, substantially reducing the number of free hydroxyl groups capable of coordinating to calcium and magnesium ions (as shown schematically in FIG. 6).

In fact, the anti-flame cellulose substrates produced by the method of the present description have excellent resistance to washing in water.

Moreover, there are no problems related to the use of highly toxic compounds: the phosphonic acids used have a low toxicity level, low volatility and high thermal stability, the latter being an important feature for reactions performed at elevated temperatures.

Finally, the sulphation and phosphorylation method described herein does not give rise to hazardous gaseous components such as ammonia or urea.

In particular the use of urea in non-stoichiometric quantities with respect to the phosphonic acid groups of the compound of formula (I) allows binding of the ammonia that forms during sulphation and of the urea itself during its passage to the liquid state, due to the formation of complexes with phosphonic groups.

The method of the present description provides a cellulose substrate having improved anti-flame properties and with physical characteristics substantially similar to those of the untreated substrate, unlike the substrates obtained with procedures known in the art.

In particular, the presence of chemical groups based on nitrogen, phosphorus and sulphur provides improved anti-flame properties.

Sulphur releases sulphuric acid allowing the cellulose material to degrade at temperatures below the ignition temperature, nitrogen forms non-combustible gases that inhibit flames and finally phosphorus inhibits the formation of levoglucosan during heating and also forms the compound $P_2O_5$, which provides a barrier effect and prevents the flame from crossing it.

A non-limiting example of an embodiment of the method of sulphation and phosphorylation of a cellulose substrate according to the present description is provided below.

A) Preparation of Cotton Yarn Nm 2/8000.

Cotton is a raw material of plant origin that—in the raw state—is in the form of fibre filaments grouped into bolls with a chemical composition shown in Table 2.

TABLE 2

| Compound | Quantity (%) |
|---|---|
| Cellulose | 83.5 |
| Fats and waxes | 0.8 |
| Pectin and lignin | 6.3 |
| Minerals and organic acids | 2.0 |
| Hemicellulose and sugars | 0.5 |
| Various | 0.4 |
| Water | 6.5 |

The percentages of impurities in cotton fibres (such as fats and waxes, pectin and lignin, mineral substances and organic acids) are very high, and impart a lipophilic character to the fibre, which is removed through chemical processes of washing and sterilization known in the textile sector.

The cotton yarn is then treated in autoclaves at 100° C. at a pressure of 3.5 bar for one hour as follows:

i) Washing with a solution having a substrate:bath ratio equal to about 1:10 weight/weight, where the composition of the solution is illustrated in Table 3.

TABLE 3

| Compound | Quantity (% w/w) |
|---|---|
| Deionized water | 95.2% |
| Lauryl ether sulphate 27% w/w | 0.2% |
| Sodium polyacrylate MW/4500 | 0.2% |
| Caustic Soda 30% w/w | 1% | ii) Rinsing with water in 3 cycles:
Time=10 min; Temperature=40° C.; Pressure=3.5 bar.

The resulting product is a white yarn with hydrophilic properties able to receive the subsequent sulphation and phosphorylation reactions.

B) Preparation of the Solution for the Sulphation and Phosphorylation Method:

The sulphation-phosphorylation solution is prepared by mixing the following in the order given and under heated condition (approximately 50° C.): water at 55% w/w, urea at 17% w/w, hydroxyethyl-imino-bis (methylene-phosphonic) acid at 20% w/w and ammonium sulphamate at 8% w/w.

C) Preparation of Cotton Yarn by Immersion and Centrifugation.

200 grams of yarn are immersed in the sulphation-phosphorylation solution and subsequently centrifuged.

After centrifugation, the cotton yarn retains approximately 80% of the sulphation-phosphorylation solution.

D) Reaction with Heating and Rinsing.

The yarn obtained after centrifugation is dried with forced air for thirty minutes at 80° C. and maintained at a temperature of about 115° C. for 2 hours to obtain sulphation and phosphorylation of the cellulose.

The resulting yarn is then washed at 50° C. with detergent and water and dried again at 80° C. with forced air.

E) Assessment of Physical Parameters

The physical parameters of a yarn are the tensile strength and the tensile elongation.

These parameters were tested with an Uster® Tensorapid 4 from Uster Technologies AG using the technical standard UNI EN ISO 2062:2010.

The yarns are tested 20 times per sample, and the results expressed as mean values, with standard deviation less than 0.25.

In Table 4 the values obtained for the yarn before being subjected to the sulphation and phosphorylation method according to the present description (untreated yarn) are reported, the values obtained for a cotton yarn subjected to a sulphation and phosphorylation method according to the present description (treated yarn), and the values obtained for a yarn subjected to sulphation and phosphorylation according to the known art (yarn treated according to the prior art), that is, using a sulphation and phosphorylation solution containing ammonium sulphamate to 10%, urea 20% and 1% phosphoric acid as the catalyst.

TABLE 4

| Compound | Elongation (%) | % loss of elongation compared to untreated | Resistance (Kgf) | % loss of resistance compared to untreated |
|---|---|---|---|---|
| Untreated yarn | 18.707 | — | 2.736 | — |
| Treated yarn | 9.100 | 51.3 | 2.589 | 5.3 |
| Yarn treated according to the known art | 2.210 | 88.3 | 1.158 | 57.7 |

Three warp-weft fabrics with a weight of about 480 g/m² were woven using a laboratory loom in order to assess the abrasion resistance of a fabric made with the cotton yarn treated according to the method object of the present description.

Abrasion resistance was determined according to the UNI EN ISO 12947-2:2000 using a Martindale apparatus. The results are reported in table 5.

TABLE 5

| Compound | Breaking at cycle (N) |
|---|---|
| Fabric from untreated yarn | 21,000 |
| Fabric from treated yarn | 20,000 |
| Fabric from yarn treated according to the prior art | 4,000 |

From Tables 4 and 5, the inventors have reason to believe that yarn treated according to the method object of the present description does not undergo any change of physical properties (such as tensile strength and abrasion resistance). These characteristics are fundamental to the marketability of a textile article.

The loss of resistance for the treated yarn compared to the untreated yarn is 5%; whereas, the loss of resistance found with the yarn treated according to the sulphation and phosphorylation method of the prior art is much higher, with a loss equal to 57%.

The loss of abrasion resistance of the fabric made with yarn treated according to the present description is minimal compared to the fabric from untreated yarn: the test results show values respectively of 20,000 and 21,000 cycles, virtually equal if compared with the loss of abrasion resistance of a fabric from yarn treated according to the prior art, which has a rupture value of 4,000 cycles.

Resistance values of lower than 30% compared to an untreated fabric significantly impair the workability of a yarn in the various production processes for making a fabric.

The value of abrasion resistance of a fabric is also a fundamental characteristic: it is unlikely that a fabric with average abrasion resistance values of less than 10,000 cycles is marketable.

F) Assessment of Chemical Parameters

Volatile or releasable components present in the substrate subjected to the sulphation and phosphorylation method as described above were measured with gas-chromatography coupled to mass spectrometry performed using the head space technique.

A sample of treated yarn was tightly closed in a suitable container, brought to the desired temperature using a thermostatic bath and maintained under these conditions for a certain period of time to allow equilibration between the volatile compounds present in the sample and those released from the sample in the vapour phase. A predetermined volume of the head space (250 µl) was sampled with a gas tight syringe and injected into a gas chromatograph.

A Hewlett-Packard 5890 gas chromatograph equipped with a 5970 Mass Selective Detector (MSD) was used; the column was a 30 m Supelco SPB-1.

The initial column temperature was set at about 40° C. and maintained for 5 minutes; the temperature was raised from 40 to 250° C. with a heating ramp programmed at 20° C./min. The temperature was maintained at 250° C. for 19 minutes. The injector temperature was 220° C.

The samples obtained from step C conducted at 25° C., 110° C. and 130° C. for 1 hour were analyzed.

The analysis did not provide any appreciable results; in fact, the chromatogram of the sample is perfectly comparable to the blank: the sample does not release any volatile substances, such as ammonia or urea; in contrast to what is described in the known art methods[4,5,7].

G) Assessment of Anti-flame Parameters

A sample of yarn treated according to the present description was tested for burning behaviour using the oxygen index at room temperature through technical standard UNI EN ISO 4589-2:2008.

The sample had an L.O.I. value of 29.

The fire behaviour of a fabric made using a cotton yarn treated according to the present description was also determined.

The fabric made according to the parameters described in step E was tested according to the UNI EN ISO 15025 method A in order to determine the conformity of articles intended for protective garments.

The test uses a rectangular specimen of fabric subjected to igniting of a flame that is placed perpendicular to it for a given period of time.

The test assesses and verifies flame spreading behaviour according to the criteria below:
  no specimen shall catch fire at the top or at the side edge (respectively wales and ranks of the fabric);
  no specimen shall undergo the formation of a hole;
  no specimen shall melt, ignite or produce molten debris;
  the average value of the residual flame after ignition must be less than or equal to 2 seconds;

the average residual glow time of the debris after the ignition must be less than or equal to 2 seconds.

The test results are shown below in tables 6 and 7.

TABLE 6

| Parameters | Minimum Requirements | Treated article wales | | ranks | |
|---|---|---|---|---|---|
| Post combustion | <=2 | 0 | 0 | 0 | 0 |
| Post incandescence | <=2 | 0 | 0 | 0 | 0 |
| Combustion up to the vertical edges | No | No | No | No | No |
| Combustion up to the top edge | No | No | No | No | No |
| Formation of holes | No | No | No | No | No |
| Debris burning | No | No | No | No | No |
| ISO 11612 Classification | | Meets the requirements | | | |

TABLE 7

| Parameters | Minimum Requirements | Treated article subjected to 10 washes in water wales | | ranks | |
|---|---|---|---|---|---|
| Post combustion | <=2 | 0 | 0 | 0 | 0 |
| Post incandescence | <=2 | 0 | 0 | 0 | 0 |
| Combustion up to the vertical edges | No | No | No | No | No |
| Combustion up to the top edge | No | No | No | No | No |
| Formation of holes | No | No | No | No | No |
| Debris burning | No | No | No | No | No |
| ISO 11612 Classification | | Meets the requirements | | | |

As can be seen from the values in tables 6 and 7, the fabric sample treated according to the sulphation and phosphorylation method with at least one phosphonic acid of formula (I) according to the present description fully satisfies the criteria of the UNI EN ISO 11612 standard.

The same fabric had positive results when assessed with the following tests used for furnishings: Uni 9175:2010, Din 4102 B1, BS 5852 part 1, BS 5852, BS7176:95, BS 5867 part 2.

BIBLIOGRAPHIC REFERENCES

1. Lewin M.; Isaacs P. K. "Imparting flame resistance to materials comprising or impregnated with hydroxy group-containing polymers" From Ger. Offen. (1971), Database: CAPLUS
2. Cotton fibres. International Fibre Science and Technology Series (2007)
3. Lewin M.; Brozek J.; Martens M. M. "The system polyamide/sulfamate/dipentaerythritol: flame retardancy and chemical reactions" Polymers for Advanced Technologies (2002) Editor: Dr Abraham Domb.
4. Lewin M. "Flame retarding of polymers with sulfamates" Recent Advances in Flame Retardancy of Polymeric Materials (1997) 19th Annual BCC Conference on Flame Retardancy, Stamford, Conn., 2008. 11.
5. Lewin M. "Flame retarding of polymers with sulfamates. I. Sulphation of cotton and wool" J. Fire Sciences, 1997; 15: Technomic, 263-27
6. "Cotton fibres" International Fibre Science and Technology Series (1998), 15 (Handbook of Fibre Chemistry (2nd Edition)), 577-724.
7. "Reactions of ammonium sulfamate with amides and ureas, generation of volatile by-products" Canadian Journal of Chemistry (1956), 34, 1662-70.
8. Lewin M.; Brozek J.; Martens M. M. "A novel system for flame retarding polyamides" From Recent Advances in Flame Retardancy of Polymeric Materials (2001)
9. Blanchard E. J.; Graves E. E. "Phosphorylation of cellulose with some phosphonic acid derivatives" Textile Research Journal (2003)

The invention claimed is:

1. A method for sulphation and phosphorylation of a cellulose substrate to impart anti-flame properties to the cellulose substrate comprising the following operations:
   i) provide a cellulose substrate;
   ii) prepare a sulphation and phosphorylation solution, the sulphation and phosphorylation solution comprising water, ammonium sulphamate, urea and at least one compound of formula (I):

$$PO(OH)_2\text{---}R\text{---}PO(OH)_2 \quad (I)$$

wherein
   R represents a linear or branched, substituted or unsubstituted $C_{1-10}$ alkyl group; a $N(R_1)$ group; a $R_2N(R_3)R_4$ group;
   $R_1$ represents H, a linear or branched, substituted or unsubstituted $C_{1-5}$ alkyl group;
   $R_2$ and $R_4$ represent independently a linear or branched, substituted or unsubstituted $C_{1-5}$ alkyl group;
   $R_3$ represents a linear or branched, substituted or unsubstituted $C_{1-5}$ alkyl group; a $R_5N(R_6)R_7$ group;
   $R_5$ and $R_7$ represent independently a linear or branched, substituted or unsubstituted $C_{1-5}$ alkyl group;
   $R_6$ represents a linear or branched, substituted or unsubstituted $C_{1-5}$ alkyl group; a $R_8N(R_9)R_{10}$ group;
   $R_8$, $R_9$ and $R_{10}$ represent independently a linear or branched, substituted or unsubstituted $C_{1-5}$ alkyl group;
   with the proviso that the number of —$PO(OH)_2$ groups in the general formula (I) is not greater than 5;
   iii) immerse the cellulose substrate in the sulphation and phosphorylation solution;
   iv) extract the cellulose substrate from the sulphation and phosphorylation solution;
   v) maintain the cellulose substrate at a temperature comprised between 110° and 175° C. for a period of time comprised between 1 minute and 3 hours, obtaining at the end a sulphated and phosphorylated cellulose substrate with anti-flame properties.

2. The method for sulphation and phosphorylation according to claim 1, wherein before operation v) the substrate extracted from the sulphation and phosphorylation solution is subjected to a centrifugation and heat drying operation.

3. The method for sulphation and phosphorylation according to claim 1, wherein at the end of the operation v) the substrate is subjected to a washing operation and heat drying.

4. The method for sulphation and phosphorylation according to claim 1, wherein the sulphation and phosphorylation solution is prepared by mixing in the following order water, urea, at least one compound of formula (I) and ammonium sulphamate.

5. The method for sulphation and phosphorylation according to claim 1, wherein the sulphation and phosphorylation solution contains:
   water in a quantity between 80 and 25% w/w,
   urea in an amount between 10 and 30% w/w,
   at least one compound of formula (I) in an amount between 5 and 30% w/w, and
   ammonium sulphamate in an amount between 5 and 30% w/w.

6. The method of sulphation and phosphorylation according to claim 1, wherein when any one of the groups R, $R_1$, $R_2$, $R_3$, $R_4$, $R_5$, $R_6$, $R_7$, $R_8$, $R_9$, $R_{10}$, if present, represents a substituted alkyl group, the one or more substituents are selected independently from —OH, —COOH, —PO(OH)$_2$, —NH$_2$, —NHR$_{11}$, —NR$_{12}$R$_{13}$, —Cl, —Br, —F,
wherein
$R_{11}$, $R_{12}$ and $R_{13}$ represent independently a linear or branched, substituted or unsubstituted $C_{1-5}$ alkyl group.

7. The method for sulphation and phosphorylation according to claim 6, wherein when any one of the groups $R_{11}$, $R_{12}$ and $R_{13}$ of the general formula (I), if present, represents a substituted alkyl group, the one or more substituents are represented by the —PO(OH)$_2$ group.

8. The method for sulphation and phosphorylation according to claim 1, wherein the groups $R_2$, $R_4$, $R_5$ and $R_8$, if present, represent independently an unsubstituted alkyl group.

9. The method for sulphation and phosphorylation according to claim 1, wherein when the groups $R_3$, $R_6$, $R_7$, $R_9$ and $R_{10}$, if present, represent independently a substituted alkyl group, the one or more substituents are represented by the —PO(OH)$_2$ group.

10. The method for sulphation and phosphorylation according to claim 1, wherein the at least one phosphonic compound of formula (I) is selected from: 1-hydroxyethan-1,1-diphosphonic acid, hydroxyethyl-imino-bis-(methylene-phosphonic) acid, amino-tris-(methylene phosphonic) acid, ethylenediamine tetra-(methylene phosphonic) acid, diethylentriamine-penta-(methylene phosphonic) acid, (1-aminoethylidene) bisphosphonic acid, oxidronic acid, pamidronic acid, alendronic acid, (1-hydroxy-2-methyl-1-phosphonopropyl) phosphonic acid, (aminomethylene) bisphosphonic acid, 1-hydroxypentane-1,1-bisphosphonic acid, [(2-hydroxypropan-1,3-diyl) bis(nitrilodimethane-diyl)] tetrakis-phosphonic acid, clodronic acid, (difluoromethylene) bisphosphonic acid, (dibromomethylene) bisphosphonic acid, (hydroxymethan) bisphosphonic acid.

11. The method for sulphation and phosphorylation according to claim 1, wherein the cellulose substrate comprises cellulose fibres of natural or artificial origin, or mixtures thereof.

12. The method for sulphation and phosphorylation according to claim 1, wherein the sulphated and phosphorylated cellulose substrate has a Limiting Oxygen Index (L.O.I.) between 25 and 35.

13. The method for sulphation and phosphorylation according to claim 1, wherein the sulphated and phosphorylated cellulose substrate has a tensile strength, abrasion resistance and a hand substantially equal to those of an untreated substrate.

14. A cellulose substrate with anti-flame properties obtained by implementing the method according to claim 1.

15. The method for sulphation and phosphorylation according to claim 1, wherein the sulphation and phosphorylation solution is prepared under a heated condition.

16. The method for sulphation and phosphorylation according to claim 1, wherein
R represents a linear or branched, substituted or unsubstituted $C_{1-5}$ alkyl group; a N($R_1$) group; a $R_2$N($R_3$)$R_4$ group;
$R_1$ represents H, a linear or branched, substituted or unsubstituted $C_{1-3}$ alkyl group;
$R_2$ and $R_4$ represent independently a linear or branched, substituted or unsubstituted $C_{1-3}$ alkyl group;
$R_3$ represents a linear or a branched, substituted or unsubstituted $C_{1-3}$ alkyl group; a $R_5$N($R_6$)$R_7$ group;
$R_5$ and $R_7$ represent independently a linear or branched, substituted or unsubstituted $C_{1-3}$ alkyl group;
$R_6$ represents a linear or branched, substituted or unsubstituted $C_{1-3}$ alkyl group; a $R_8$N($R_9$)$R_{10}$ group;
$R_8$, $R_9$ and $R_{10}$ represent independently a linear or branched, substituted or unsubstituted $C_{1-3}$ alkyl group.

17. The method for sulphation and phosphorylation according to claim 2, wherein the heat drying operation occurs at a temperature between 70 and 90° C.

18. The method for sulphation and phosphorylation according to claim 3, wherein the washing operation occurs under a heated condition.

19. The method for sulphation and phosphorylation according to claim 3, wherein the substrate is subjected to the washing operation, under a heated condition, and heat drying, at a temperature between 70 and 90° C.

20. The method for sulphation and phosphorylation according to claim 5, wherein the sulphation and phosphorylation solution contains:
water in a quantity between 50 and 60% w/w,
urea in an amount between 10 and 20% w/w,
at least one compound of formula (I) in an amount between 10 and 20% w/w, and
ammonium sulphamate in an amount between 8 and 15% w/w.

21. The method of sulphation and phosphorylation according to claim 6, wherein
$R_{11}$, $R_{12}$ and $R_{13}$ represent independently a linear or branched, substituted or unsubstituted $C_{1-3}$ alkyl group.

22. The method for sulphation and phosphorylation according to claim 12, wherein the sulphated and phosphorylated cellulose substrate has a Limiting Oxygen Index (L.O.I) between 28 and 32.

* * * * *